United States Patent
Chung (10) Patent No.: US 6,875,915 B1
(45) Date of Patent: Apr. 5, 2005

(54) LIGHTNING ARRESTER

(76) Inventor: Young-Ki Chung, 102-1404, Samsung Apt., 374 Dangsan-dong, Yeongdeungpo-gu, 150-040 Seoul (KR)

( * ) Notice: Subject to any disclaimer, the term of this patent is extended or adjusted under 35 U.S.C. 154(b) by 0 days.

(21) Appl. No.: 10/681,307

(22) Filed: Oct. 9, 2003

(30) Foreign Application Priority Data

Sep. 6, 2003 (KR) ........................................ 2003/62337

(51) Int. Cl.⁷ .............................................. H02G 13/00
(52) U.S. Cl. ............................... 174/3; 174/2; 174/4 R; 361/220; 361/221; 135/96
(58) Field of Search ............................. 174/2, 3, 4 R; 361/220, 221; 135/96

(56) References Cited

U.S. PATENT DOCUMENTS

| | | | |
|---|---|---|---|
| 4,180,698 A | * 12/1979 | Carpenter, Jr. ................. | 174/2 |
| 4,752,854 A | 6/1988 | Lefort et al. | |
| 6,167,896 B1 | * 1/2001 | Smith ........................... | 135/96 |
| 6,307,149 B1 | * 10/2001 | Zini et al. .................... | 361/221 |

FOREIGN PATENT DOCUMENTS

EP 0096655 9/1985

* cited by examiner

*Primary Examiner*—Chau N. Nguyen
*Assistant Examiner*—Jinhee Lee
(74) *Attorney, Agent, or Firm*—Mark M. Friedman (57) ABSTRACT

Disclosed is a lightning arrester. The lightning arrester safely discharges earth charge of a main electrode section and an auxiliary electrode section regardless of a variation of charge contained in air, so charge charged in a thundercloud is safely discharged into the earth even if the thundercloud is located far-remote from the earth. The lightning arrester has a fixing base fixedly installed on an object to be protected by grounding a lightning circuit connected to a ground electrode grounded to an earth, a fixing bar vertically installed at one side of an upper surface of the fixing base and made of conductive material, a main electrode section making contact with an upper portion of the fixing bar and made of conductive material, an upper polymer insulator including an elongated column member formed at a center thereof with a hollow section for receiving the fixing bar therein, and upper and lower disc-shaped plates integrally formed at an upper end of the elongated column member for ensuring an insulation distance, and an auxiliary electrode section aligned below the main electrode section without making contact with the main electrode section and made of conductive material. The elongated column member of the upper polymer insulator passes through a center of the auxiliary electrode section in order to fill space charge in the auxiliary electrode section.

8 Claims, 6 Drawing Sheets

LIGHTNING ARRESTER

BACKGROUND OF THE INVENTION

1. Field of the Invention

The present invention relates to a lightning arrester installed at an uppermost part of a building to be protected, and more particularly to a lightning arrester capable of safely discharging charge, which is charged in an atmosphere adjacent to a building as thundercloud approaches the building, to the earth.

2. Description of the Prior Art

As generally known in the art, a lightning arrester is installed at an uppermost part of a building to be protected in order to safely discharge charge charged in a thundercloud to the earth by forming a discharge path between the thundercloud and the earth. In a fine day, an electric field in the earth is about 100V/m. However, if the thundercloud approaches, the electric field in the earth is about 10000V/m, and a potential difference between the earth and the thundercloud is about 100 million volts.

At this time, air existing in an atmospheric layer may act as a dielectric insulator in order to prevent a lightning stroke from being created between the earth and the thundercloud. Nevertheless, sometimes the lightning stroke can be created between the earth and the thundercloud.

Generally, a lightning arrester is installed at an uppermost part of a building to be protected in order to safely guide the lightning stroke into the earth. A Franklin rod type lightning arrester utilizes an electric field phenomenon called "tip effect", in which an electric field is concentrated in a tip part of the lightning arrester.

A principle of the Franklin rod type lightning arrester is disclosed in various documents including Japanese Patent Laid-open Publication No. 62-216197 issued on Sep. 22, 1987.

The Franklin rod type lightning arrester utilizes spontaneously created natural phenomena so that it is operated only when a dielectric breakdown of air is created. Therefore, the Franklin rod type lightning arrester cannot effectively deal with the lightning stroke caused by a thundercloud, which does not make the dielectric breakdown of air. In order to effectively protect objects to be protected from the lightning stroke, various lightning arresters capable of effectively guiding charge charged in the thundercloud into the earth by discharging charge into an atmosphere as the thundercloud approaches the objects have been developed.

For example, French Patent Laid-open Publication No. 0096655 (issued on May 26, 1983) discloses a lightning arrester includes a main electrode grounded to an earth so as to allow ground charge to be concentrated on the main electrode through a tip effect, and an auxiliary electrode installed at a side of the main electrode in order to generate a stepped leader together with the main electrode by collecting charge distributed in an atmosphere. Discharge is generated between the main electrode and the auxiliary electrode. Ion charge is discharged into the atmosphere through the discharge process between the main electrode and the auxiliary electrode, so that a discharge path is easily formed between the thundercloud and the main electrode, thereby allowing charge in the thundercloud to be absorbed in the ground.

In addition, a lightning arrester disclosed in above Japanese Patent Laid-open Publication No. 62-216197 includes a collecting electrode for collecting charge, which is created when the thundercloud approaches the earth, from a peripheral area of the earth in order to induce discharge between an auxiliary electrode and a main electrode, and a high-voltage generating circuit having a determining section for determining a variation of charge generated from the collecting electrode. Charge of the collecting electrode is used as a power source of the high voltage generating circuit by recharging charge of the collecting electrode through a condenser. The high-voltage generating circuit is operated when the variation of charge exceeds a predetermined level, so that charge charged in the condenser is fed to a reactor, thereby generating discharge between the main electrode and the auxiliary electrode.

However, the lightning an ester disclosed in the above French Patent Laid-open Publication is installed at an uppermost part of a building to be protected so that an earth electric field induced by the thundercloud is inefficiently formed at the uppermost part of the building. Thus, if discharge is induced through filling charge contained in air, filling efficiency of charge is lowered so that discharge is difficult. For this reason, a discharge probability is lowered.

In addition, the lightning arrester disclosed in the above Japanese Patent Laid-open Publication uses a plurality of electronic components so not only is a structure of the lightning arrester complicated, but also it frequently requires exchange and repair works for the components of the lightning arrester installed at the uppermost part of the building.

SUMMARY OF THE INVENTION

Accordingly, the present invention has been made in view of the above-mentioned problems, and it is an object of the present invention to provide a lightning arrester having a main electrode section formed at an upper portion of a fixing bar, into which earth charge is filled when a thundercloud approaches, a dielectric insulator formed at an outer portion of the fixing bar by using an electrification state of the fixing bar, an auxiliary electrode section having opposite electrodes, including conductive material, and integrally formed with the outer surface of the dielectric insulator, and $TiO_2$ having high dielectric constant in relation to electrostatic capacity and capable enlarging a surface area of the auxiliary electrode section through filling a great amount of charge from an atmosphere into the auxiliary electrode section, thereby improving reliability of the lightning arrester, safely and previously seed-discharging ground charge of the main electrode and auxiliary electrode sections regardless of variation of charge contained in air, and safely discharging charge charged in the thundercloud into the earth even if the thundercloud is located far-remote from the earth.

In order to achieve the above object, the present invention provides a lightning arrester for absorbing lighting falling down from a thundercloud, the lightning arrester comprising: a fixing base fixedly installed on an object to be protected by grounding a lightning circuit connected to a ground electrode grounded to an earth; a fixing bar vertically installed at one side of an upper surface of the fixing base and made of conductive material; a main electrode section making contact with an upper portion of the flexing bar and made of conductive material; an upper polymer insulator including an elongated column member formed at a center thereof with a hollow section for receiving the fixing bar therein. and upper and lower disc-shaped plates integrally formed at an upper end of the elongated column member for ensuring an insulation distance; and an auxiliary electrode section aligned below the main electrode section without making contact with the main electrode section and made of conductive material, the elongated column member of the upper polymer insulator passing through a center of the auxiliary electrode section in order to fill space charge in the auxiliary electrode section.

According to the preferred embodiment of the present invention, the main electrode section has a disc-shaped base plate formed at a center thereof with a hole for receiving a protrusion of the fixing bar and a plurality of triangular shaped top plates formed along an outer peripheral surface of the disc-shaped base plate while forming a predetermined interval therebetween.

The auxiliary electrode section includes a first auxiliary electrode member made of conductive material, formed at an upper surface thereof with a plurality of triangular plates arranged at a predetermined interval and formed at a center thereof with a first perforation hole for receiving the elongated column member of the upper polymer insulator, a pair of second auxiliary electrode members made of conductive material, making contact with an underside of the first auxiliary electrode member and formed at a center thereof with a second perforation hole for receiving the elongated column member of the upper polymer insulator, a third auxiliary electrode member made of conductive material and having a hollow column member receiving the elongated column member of the upper polymer insulator, and a filler. Upper and lower ends of the elongated column member extend beyond upper and lower ends of the hollow column member. The upper end of the hollow column member makes contact with an underside of the second auxiliary electrode members. A space is formed between an inner wall of the third auxiliary electrode member and an outer wall of the elongated column member when the elongated column member is received in the third auxiliary electrode member. The filler is filled in the space formed between the inner wall of the third auxiliary electrode member and the outer wall of the elongated column member in order to improve capacitance of the third auxiliary electrode member. O-rings are installed at upper and lower portions of the space in order to prevent the filler from being leaked.

A lower polymer insulator is aligned below the auxiliary electrode section in order to ensure the insulation distance. The lower polymer insulator is provided at a center thereof with a short column member. Upper and lower disc-type plates are integrally formed with an upper outer wall of the short column member while forming a predetermined interval therebetween.

A fastening member screw-coupled to one end of the fixing bar in order to press a lower surface of the auxiliary electrode section. The fastening member is formed at a center thereof with a screw hole.

The filler includes $TiO_2$.

BRIEF DESCRIPTION OF THE DRAWINGS

The above and other objects features and advantages of the present invention will be more apparent from the following detailed description taken in conjunction with the accompanying drawings, in which.

DETAILED DESCRIPTION OF THE PREFERRED EMBODIMENTS

Hereinafter, a preferred embodiment of the present invention will be described with reference to the accompanying drawings. In the following description and drawings, the same reference numerals are used to designate the same or similar components, and so repetition of the description on the same or similar components will be omitted.

Figure 1:
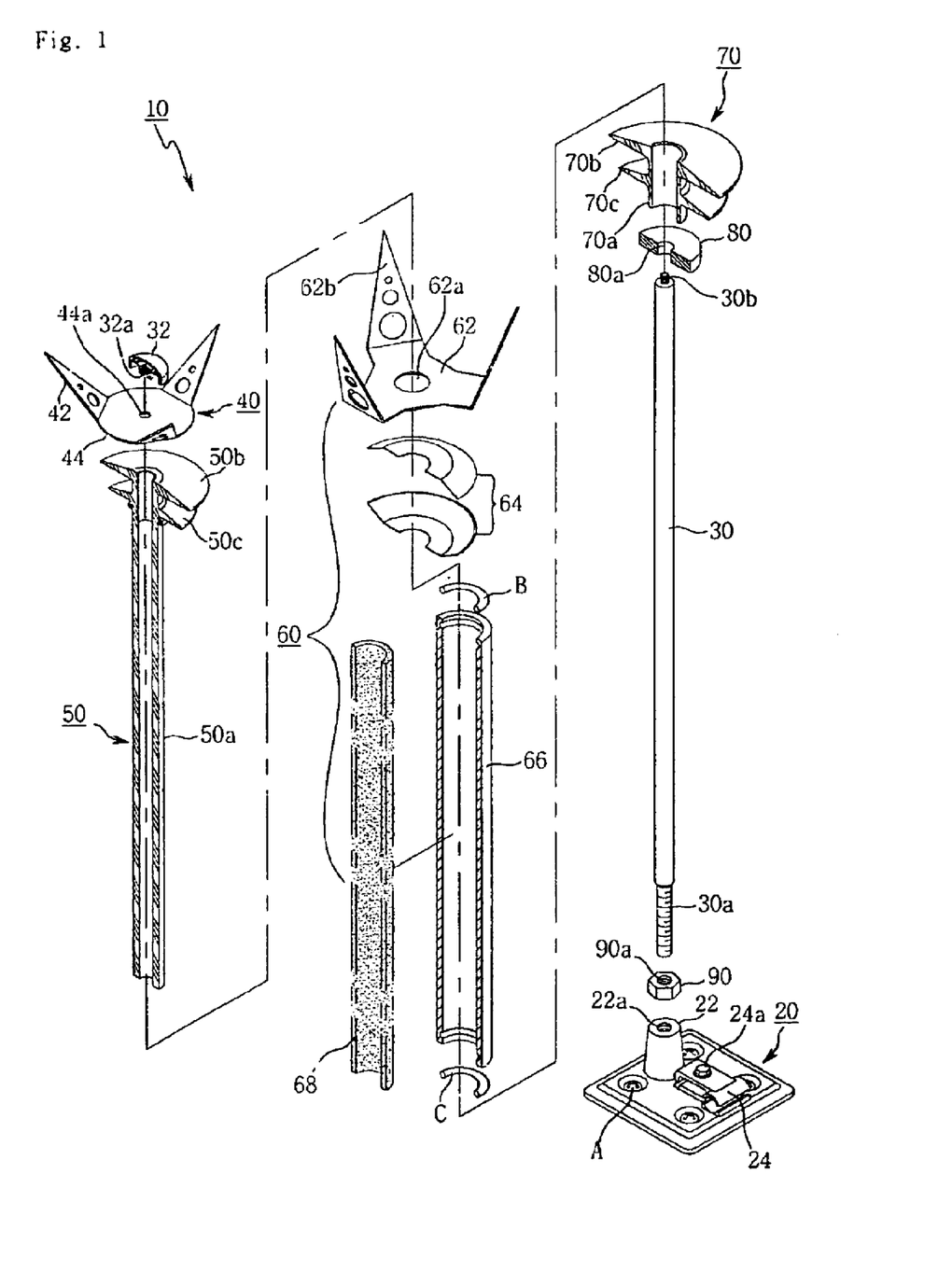
FIG. 1 is a partially sectional exploded perspective view of a lightning arrester according to a first embodiment of the present invention.
Figure 2:
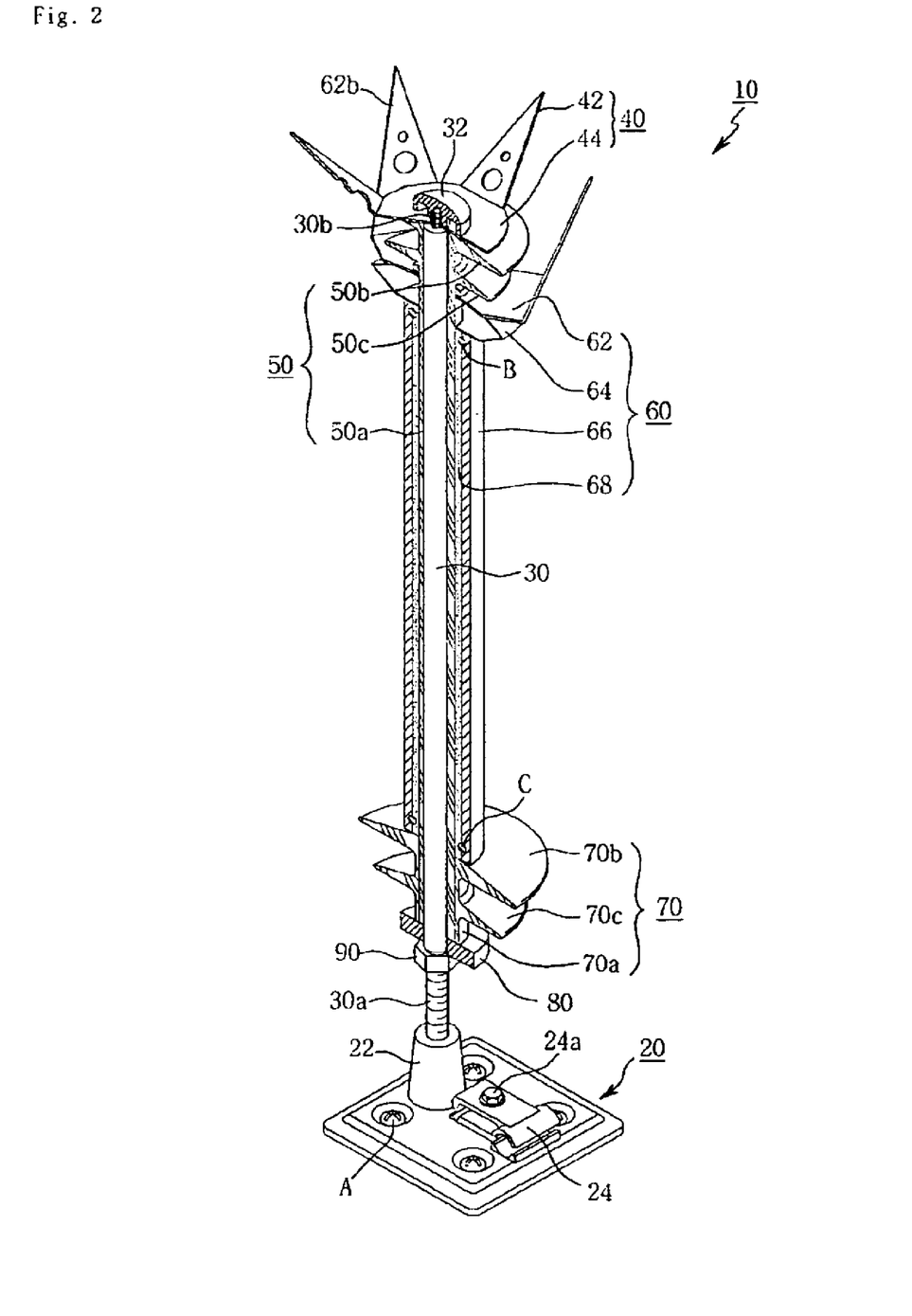
FIG. 2 is a partially sectional perspective view of a lightning arrester shown in FIG. 1.

FIG. 1 is a partially sectional exploded perspective view of a lightning arrester 10 according to a first embodiment of the present invention, and FIG. 2 is a partially sectional perspective view of the lightning arrester 10 shown in FIG. 1.

As shown in FIGS. 1 and 2, the lightning arrester 10 of the present invention includes a fixing base 20 fixed to an uppermost part of an object to be protected through fixing screws A, a fixing bar 30 vertically installed on an upper surface of the fixing base 20, a main electrode section 40 made of conductive material and making contact with an upper portion of the fixing bar 30, an upper polymer insulator 50 having an elongated column member 50a for receiving the fixing bar 30 at a center thereof to ensure an insulation distance with respect to the main electrode section 40, an auxiliary electrode section 60 made of conductive material and receiving the elongated column member 50a of the upper polymer insulator 50 at a center thereof in such a manner that the auxiliary electrode section 60 is sequentially aligned below the main electrode section 40 in a non-contact manner for filling space charge, a lower polymer insulator 70 aligned below the auxiliary electrode section 60 and receiving the elongated column member 50a of the upper polymer insulator 50 at a center thereof in order to ensure an insulation distance with respect to the fixing base 20, a disc-type fixing member 80 formed at a center thereof with a perforation hole 80a, through which the fixing bar 30 passes in such a manner that the upper lower polymer insulator 70 is prevented from being separated from the elongated column member 50a of the upper polymer insulator 50, and a fastening member 90 formed at a center thereof with a screw hole and screw-coupled to one end of the fixing bar 30 in order to press a lower surface of the fixing, member 80.

The fixing base 20 is provided at the upper surface thereof with a coupling boss 22, which is formed at a center thereof with a screw hole 22a. One end of the fixing bar 30d is fixedly screw-coupled into the screw hole 22a. A ground piece 24 is provided at one side of the coupling boss 22. The ground piece 24 can be fixed to or released from the fixing base 20 by adjusting a fastening screw 24a in order to ground a lightning circuit grounded to a ground electrode (not shown).

The fixing bar 30 is formed at one end thereof with a screw section 30a, which is screw-coupled into the screw hole 22a of the coupling boss 22. A protrusion 30b formed at an outer surface thereof with a screw is provided at the other end of the fixing bar 30 so as to fix the main electrode section 40.

The protrusion 30b is screw-coupled into a screw hole 32a of a cover 32 in order to prevent the main electrode section 40 from being separated.

Although it is illustrated that the main electrode section 40 is prevented from being separated due to a coupling between the cover and the fixing bar 30, the main electrode section 40 can be fixed through various manner. For example, the protrusion 30b of the fixing bar can be welded to a center of the main electrode section 40 in order to prevent the main electrode section 40 from being separated.

The main electrode section 40 includes a disc-shaped base plate 44 formed at a center thereof with a hole 44a for receiving the protrusion 30b of the fixing bar 30 and a plurality of triangular top plates 42 integrally formed at an upper peripheral portion of the base plate 42 in order to absorb lightning falling down from the thundercloud.

The triangular top plates 42 are outwardly inclined when installing the lightning arrester 10.

The upper polymer insulator 50 has the elongated column member 50a having a hole for receiving the foxing bar 30. Upper and lower disc-shaped plates 50b and 50c are integrally formed at an upper end of the elongated column member 50a. The upper and lower disc-shaped plates 50b and 50c are spaced from each other by a predetermined distance in order to ensure an insulation distance with respect to the main electrode section 40 and the auxiliary electrode section 60.

The auxiliary electrode section 60 includes a first auxiliary electrode member 62 made of conductive material and formed at an upper surface thereof with a plurality of triangular plates 62b arranged at a predetermined interval, a pair of second auxiliary electrode members 64 made of conductive material, a third auxiliary electrode member 66 made of conductive material, and a filler 68 including $TiO_2$. The first auxiliary electrode member 62 is aligned below the lower disc-shaped plate 50c of the upper polymer insulator 50 in such a manner that the first auxiliary electrode member 62 does not make contact with the main electrode section 40, thereby absorbing a great amount of charge from the atmosphere as the thundercloud approaches. A perforation hole 62a is formed at a center of the first auxiliary electrode member 62 for receiving the elongated column member 50a of the upper polymer insulator 50. An upper surface of the second auxiliary electrode members 64 makes contact with an underside of the first auxiliary electrode member 62. The second auxiliary electrode members 64 are formed at a center thereof with a perforation hole for receiving the elongated column member 50a of the upper polymer insulator 50. The third auxiliary electrode member 66 includes a hollow column member receiving the elongated column member 50a of the upper polymer insulator 50. Upper and lower ends of the elongated column member 50a extend beyond upper and lower ends of the hollow column member. The upper end of the hollow column member makes contact with an underside of the second auxiliary electrode members 64. A space is formed between an inner wall of the third auxiliary electrode member 66 and an outer wall of the elongated column member 50a when the elongated column member 50a is received in the third auxiliary electrode member 66. The filler 68 is filled in the space formed between the inner wall of the third auxiliary electrode member 66 and the outer wall of the elongated column member 50a in order to improve capacitance of the third auxiliary electrode member 66. O-rings B and C are installed at upper and lower portions of the space in order to prevent the filler 66 from being leaked.

The lower polymer insulator 70 has a relatively short column member 70a for receiving the elongated column member 50a of the upper polymer insulator 50. Upper and lower disc-shaped plates 70b and 70c are integrally formed at an upper end of the short column member 70a, which are spaced from beach other by a predetermined distance for ensuing an insulation distance with respect to the auxiliary electrode section 60 and the fixing base 20.

Figure 3:
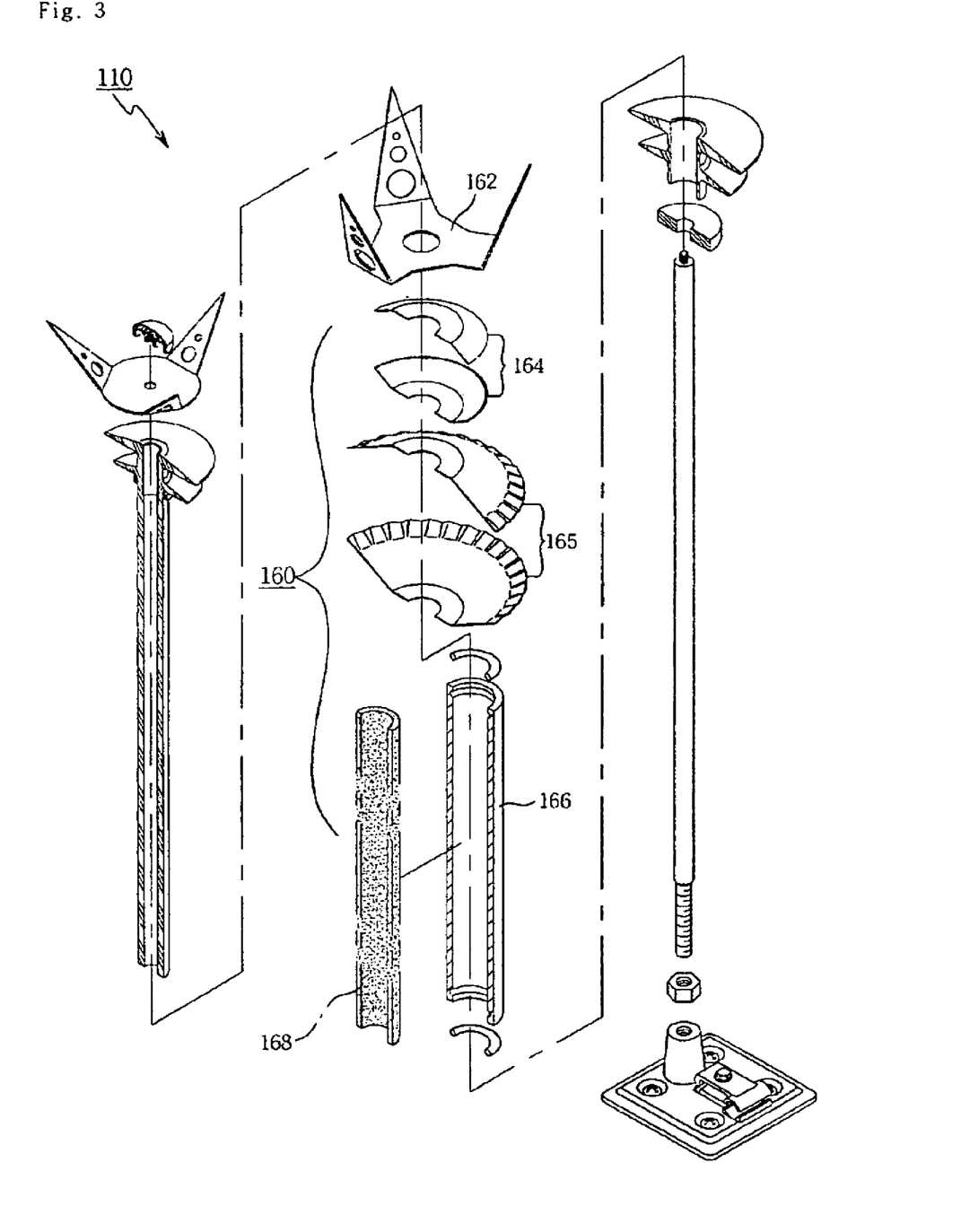
FIG. 3 is a partially sectional exploded perspective view of a lightning arrester according to a second embodiment of the present invention.
Figure 4:
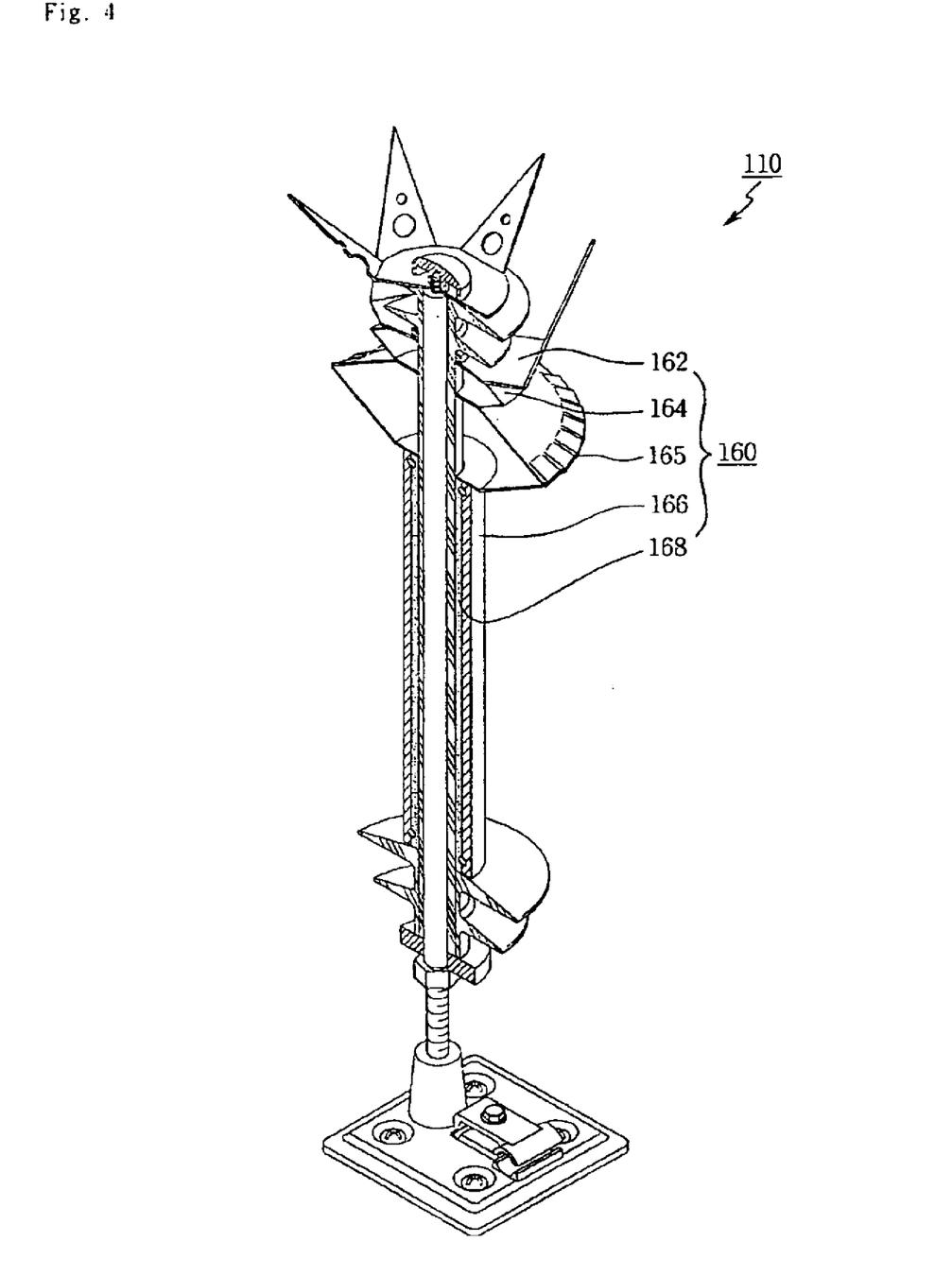
FIG. 4 is a partially sectional perspective view of a lightning arrester shown in FIG. 3.
Figure 5:
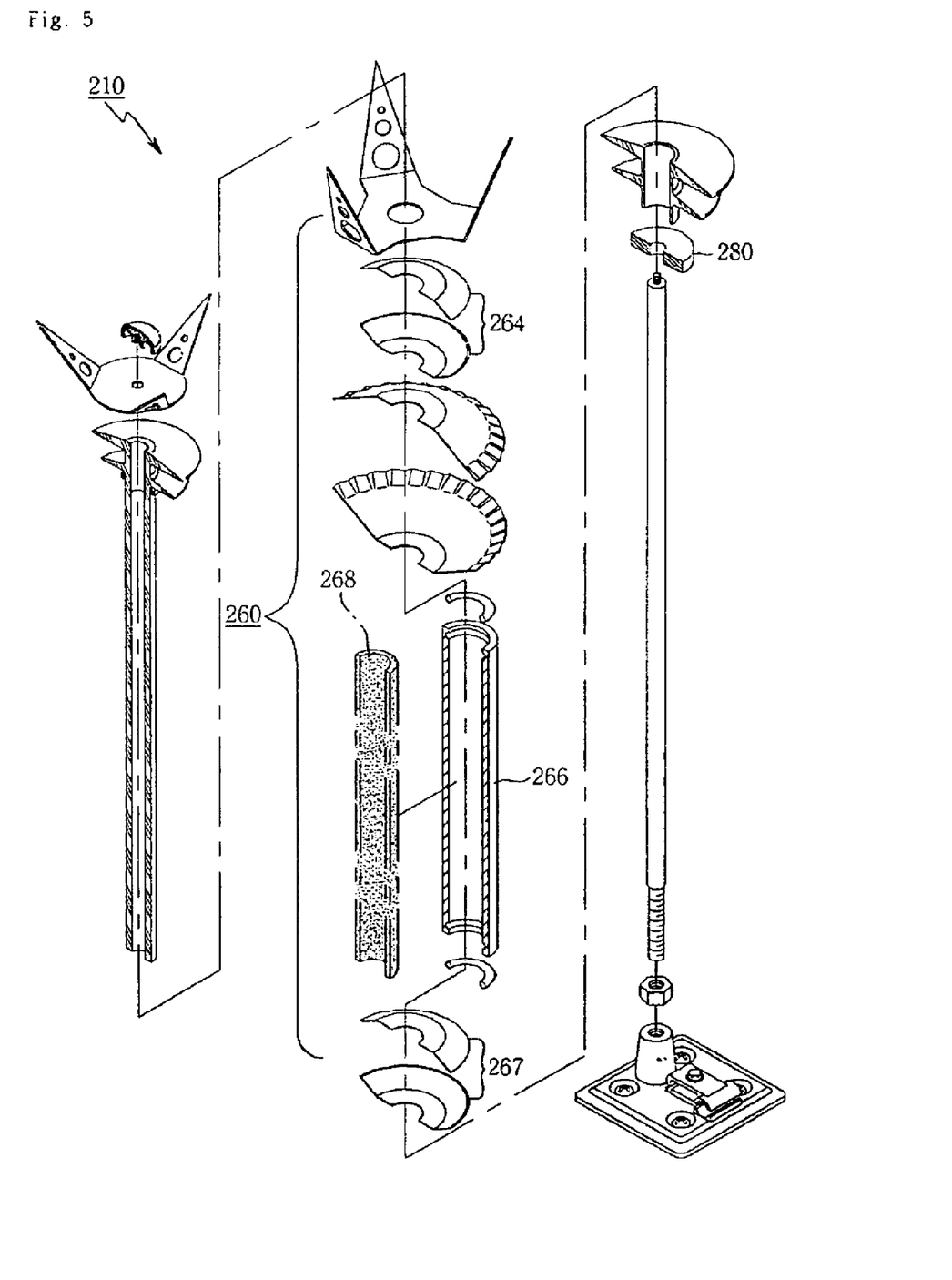
FIG. 5 is a partially sectional exploded perspective view of a lightning arrester according to a third embodiment of the present invention.
Figure 6:
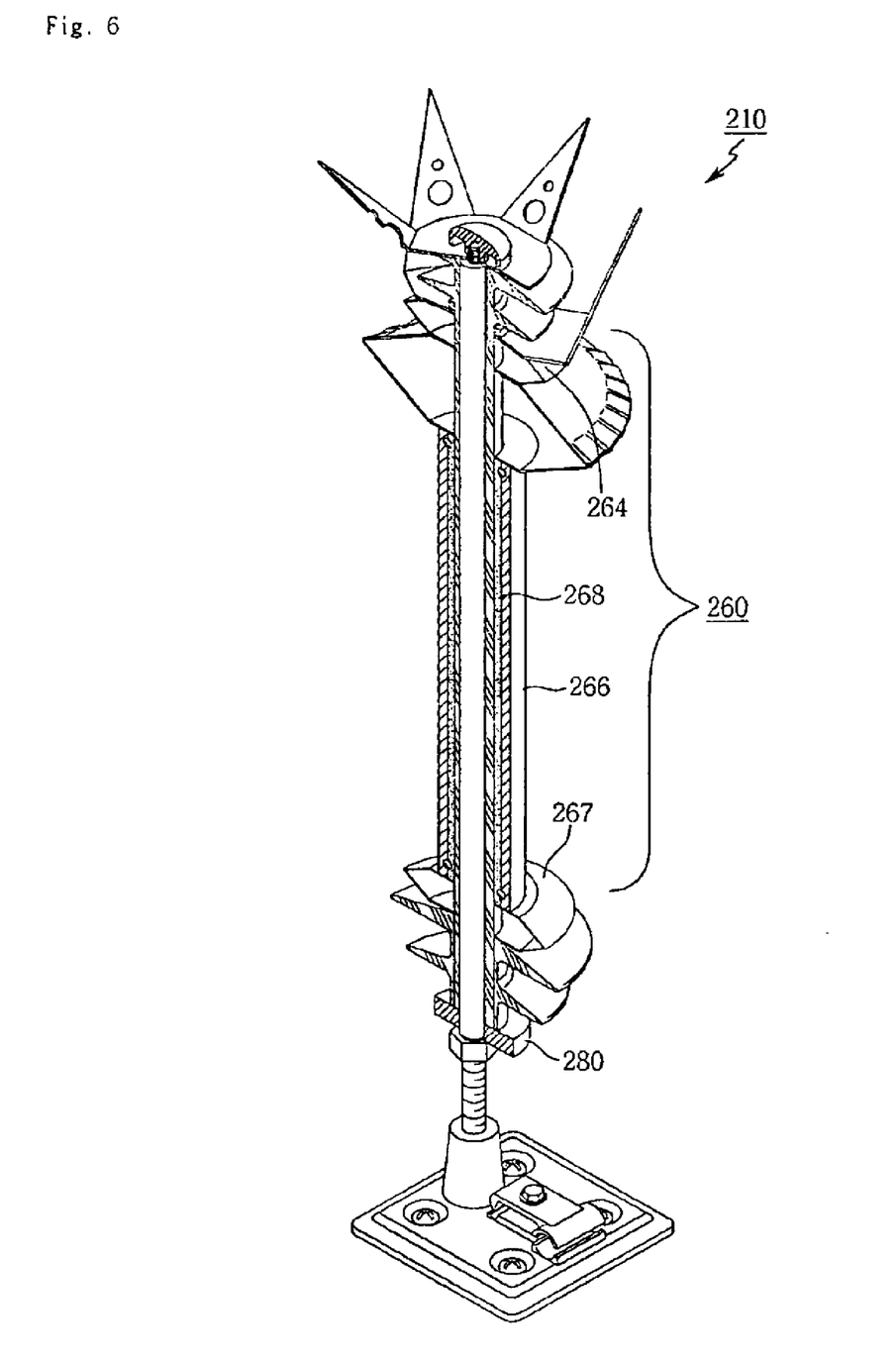
FIG. 6 is a partially sectional perspective view of a lightning arrester shown in FIG. 5.

The lightning arrester 10 of the present invention shown in FIGS. 1 and 2 includes the auxiliary electrode section 60 having first to third auxiliary electrode members 62, 64 and 66 sequentially and downwardly aligned from the underside of the lower disc-shaped plate 50c of the upper polymer insulator 50 such that the auxiliary electrode section 60 does not make contact with the main electrode section 40. However, the present invention is not limited to the above structure. According to a second embodiment of the present invention as shown in FIGS. 3 and 4, a pair of fourth auxiliary electrode members 165 made of conductive material and having a diameter larger than a diameter of the second auxiliary electrode member 164 can be provided between the second auxiliary electrode member 164 and the third auxiliary electrode member 166 filled up with the filler 168. In this case, an upper surface of the fourth auxiliary electrode members 165 makes contact with an underside of the second auxiliary electrode member 164, and a lower surface of the fourth auxiliary electrode members 165 makes contact with an upper portion of the third auxiliary electrode member 166. In addition, according to a third embodiment of the present invention as shown in FIGS. 5 and 6, a lightning arrester 210 having an auxiliary electrode section 260 is provided, in which a sixth auxiliary electrode member 267 made of conductive material identical to conductive material forming a second auxiliary electrode member 265 is formed between a third auxiliary electrode member 266 filled up with a filler 268 and a lower polymer insulator 70.

In addition, although it is illustrated in FIGS. 1 to 6 that the filler is filled in the space section formed between the third auxiliary electrode member and the upper polymer insulator, it is also possible to selectively fill the filler in one of second, fourth and sixth auxiliary electrode members.

When installing the lightning arrester of the present invention having the above structure on the uppermost part of a building to be protected, the protrusion 30b formed at the upper end of the fixing bar 30 is firstly screw-coupled into the screw hole 32a of the cover 32 by passing through the perforation hole 44a formed at the center of the main electrode section 40, thereby fixing the main electrode section 40.

Then, the other end of the fixing bar 30 is inserted into the elongated column member 50a of the upper polymer insulator 50 having the upper and lower disc-shaped plates 50b and 50c for ensuring the insulation distance. At this time, the upper surface of the upper disc-shaped plate 50b makes contact with the underside of the main electrode section 40.

After that, the elongated column member 50a of the upper polymer insulator 50 sequentially passes through centers of the first to third auxiliary electrode members 62, 64, and 66 of the auxiliary electrode section 60. Then, filler 68, such as $TiO_2$, is filled in the space formed between the third auxiliary electrode member 66 and the elongated column member 50a of the upper polymer insulator 50 so as to increase capacitance of the third auxiliary electrode member 66.

That is, the elongated column member 50a of the upper polymer insulator 50 firstly passes through the perforation hole 62a formed at the center of the first auxiliary electrode member 62 having a plurality of triangular plates 62b, which are install led on the upper surface of the first auxiliary electrode member 62 such that they arc outwardly inclined.

Then, the elongated column member 50a of the upper polymer insulator 50 passes through the perforation hole formed at the center of the pair of second auxiliary electrode members 64. After that, the elongated column member 50a of the upper polymer insulator 50 passes through the center of the third auxiliary electrode member 66 with installing the O-ring B at the tipper inner portion of the third auxiliary electrode member 66.

Then, the filler 68 is filled in the space formed between the elongated column member 50a and the third auxiliary electrode member 66 and the bring C is installed at the lower inner portion of the third auxiliary electrode member 66 in order to prevent the filler 68 from being leaked from the space.

After that, the elongated column member 50a having the fixing bar 30 therein passes through the center of the short column member 70 of the lower polymer insulator 70, which is provided for ensuring the insulation distance with respect to the auxiliary electrode section 60 and the fixing base 20.

In order to prevent the auxiliary electrode section 60 and the lower polymer insulator 70 from being separated from the elongated column member 50a of the upper polymer insulator 50, the fixing bar 40 passes through the perforation hole 80a formed at the center of the fixing member 80. Then, the fastening member 90 fixedly presses the lower polymer insulator 70.

After that the screw section 30a of the fixing bar 30 is screw-coupled into the coupling boss 22 of the fixing base 20.

When the thundercloud approaches in a state that the lightning arrester is installed at the uppermost part of the building to be protected, the fixing bar 30 and the main electrode section 40 making contact with the upper end of the fixing bar 30 are filled with ground charge, and the auxiliary electrode section 60, which does not make contact with the fixing bar and the main electrode section 40 due to the upper polymer insulator 50, is filled with space charge due to the filler 68 filled in the space formed between the third auxiliary electrode member 66 and the elongated column member 50a of the upper polymer insulator 60, so the lightning arrester effectively absorbs lightning falling down from the thundercloud located far-remote from the lightning arrester.

That is, lightning has relatively low voltage since the thundercloud is located far-remote from the lightning arrester, so the lightning arrester effectively discharge lighting having low voltage into the ground.

As described above, the lightning arrester of the present invention includes the main electrode section formed at the upper portion of the fixing bar, which is screw-coupled with the coupling boss of the fixing base fixed to the building to be protected, the upper polymer insulator receiving the fixing bar by using the electrification state of the fixing bar, an auxiliary electrode section having opposite electrodes and integrally formed with the outer surface of the upper polymer insulator, and the filler capable filling a great amount of charge from an atmosphere into the auxiliary electrode section, thereby improving reliability of the lightning arrester, safely discharging ground charge of the main electrode and auxiliary electrode sections regardless of is variation of charge contained in air, and safely discharging charge charged in the thundercloud into the earth even if the thundercloud is located far-remote from the earth.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

What is claimed is:

1. A lightning arrester for absorbing lighting falling down from a thundercloud, the lightning arrester comprising:

a fixing base fixedly installed on an object to be protected by grounding a lightning circuit connected to a ground electrode grounded to an earth;

a fixing bar vertically installed at one side of an upper surface of the fixing base and made of conductive material;

a main electrode section making contact with an upper portion of the fixing bar and made of conductive material;

an upper polymer insulator including an elongated column member formed at a center thereof with a hollow section for receiving the fixing bar therein, and upper and lower disc-shaped plates integrally formed at an upper end of the elongated column member for ensuring an insulation distance; and an auxiliary electrode section aligned below the main electrode section without making contact with the main electrode section and made of conductive material, the elongated column member of the upper polymer insulator passing through a center of the auxiliary electrode section in order to fill space charge in the auxiliary electrode section.

2. The lightning arrester as claimed in claim 1, wherein the main electrode section has a disc-shaped base plate formed at a center thereof with a hole for receiving a protrusion of the fixing bar and a plurality of triangular shaped top plates formed along an outer peripheral surface of the disc-shaped base plate while forming a predetermined interval therebetween.

3. The lightning arrester as claimed in claim 2, wherein the auxiliary electrode section includes a first auxiliary electrode member made of conductive material, formed at an upper surface thereof with a plurality of triangular plates arranged at a predetermined interval and formed at a center thereof with a fast perforation hole for receiving the elongated column member of the upper polymer insulator, a pair of second auxiliary electrode members made of conductive material, making contact with an underside of the first auxiliary electrode member and formed at a center thereof with a second perforation hole for receiving the elongated column member of the upper polymer insulator, a third auxiliary electrode member made of conductive material and having a hollow column member receiving the elongated column member of the upper polymer insulator, and a filler, upper and lower ends of the elongated column member extending beyond upper and lower ends of the hollow column member, the upper end of the hollow column member making contact with an underside of the second auxiliary electrode members, a space is being formed between an inner wall of the third auxiliary electrode member and an outer wall of the elongated column member when the elongated column member is received in the third auxiliary electrode member, the filler being filled in the space formed between the inner wall of the third auxiliary electrode member and the outer wall of the elongated column member in order to improve capacitance of the third auxiliary electrode member, O-rings being installed at upper and lower portions of the space in order to prevent the filler from being leaked.

4. The lightning arrester as claimed in claim 3, further comprising a lower polymer insulator aligned below the auxiliary electrode section in order to ensure the insulation distance, the lower polymer insulator being provided at a center thereof with a short column member, upper and lower disc-tape plates being integrally formed with an upper outer wall of the short column member while forming a predetermined interval therebetween.

5. The lightning arrester as claimed in claim 4, further comprising a fastening member screw-coupled to one end of the fixing bar in order to press a lower surface of the auxiliary electrode section, the fastening member being formed at a center thereof with a screw hole.

6. The lightning arrester as claimed in claim 3, wherein the filler includes $TiO_2$.

7. The lightning arrester as claimed in claim 4, further comprising a pair of fourth auxiliary electrode sections having a diameter larger than a diameter of the second auxiliary electrode members, an upper surface of the fourth auxiliary electrode sections making contact with an underside of the second auxiliary electrode sections, a lower surface of the fourth auxiliary electrode sections making contact with an upper end of the third auxiliary electrode member.

8. The lightning arrester as claimed in claim 4, further comprising a sixth auxiliary electrode member aligned between the third auxiliary electrode member and a fixing member and made of conductive material identical to conductive material forming the second auxiliary electrode member.

* * * * *